Sept. 21, 1937.   F. GERTH ET AL   2,093,885

MEANS FOR GUIDING AEROPLANES BY RADIO SIGNALS

Filed Dec. 20, 1932

*Inventors:*
FELIX GERTH
and
ERNST KRAMAR
by R.C. Hopgood
Attorney

Patented Sept. 21, 1937

2,093,885

UNITED STATES PATENT OFFICE 2,093,885

MEANS FOR GUIDING AEROPLANES BY RADIO SIGNALS

Felix Gerth and Ernst Kramar, Berlin-Tempelhof, Germany, assignors to C. Lorenz Aktiengesellschaft, Berlin-Tempelhof, Germany, a company Application December 20, 1932, Serial No. 648,080
In Germany January 6, 1932

4 Claims. (Cl. 250—11)

Means for providing for fog or blind landing of aeroplanes is becoming of increasing importance in aviation, and the suggestion has been made to make use of ultra-short electromagnetic waves for this purpose. In this connection it has been proposed to employ a directional antenna system arranged at a certain angle to the ground at the landing place, to project a bundle of rays obliquely upwards in the direction of the wind. The pilot of an aeroplane intending to effect a landing as soon as he finds himself in the bundle of rays, pilots the machine so that the deflection of an instrument located in the anode circuit of his receiving apparatus remains constant, that is, the aeroplane is caused to follow a curve of the same field intensity. This method of landing is generally known as "slip-way beacon" landing. To render it practicable however some means must also be provided for indicating lateral deviations. It has also been suggested therefore to use a slip-way beacon in combination with a long wave beacon of a known type. In such combined systems the lateral deviations from the direction of landing (direction of wind) are ascertained from the long wave beacon and the slip curve for the landing is maintained by the ultra-short wave slip-way beacon. Such an arrangement requires however a large expenditure in apparatus, as both a complete long wave equipment and also a short wave equipment must be provided, not only on the transmitting side, but also on the receiving side. In order to simplify this arrangement therefore, it is suggested in accordance with the present invention to radiate two ultra-short waves distinguishable from each other but of the same wave length, at an angle to each other and to the ground. The lateral deviations from the direction of landing are then ascertained by means of the angular bisection of the fields and the landing itself takes place in the manner of a slip-way beacon landing. Such an arrangement results in an economy in apparatus and a simplification in operation.

Referring now to the accompanying drawing:—

Figure 1:
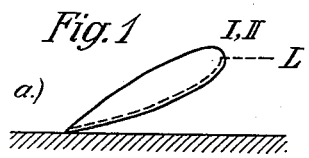
Fig. 1 shows the characteristic of the transmitting antennae, (a) in side elevation and (b) in plan.
Figure 1:
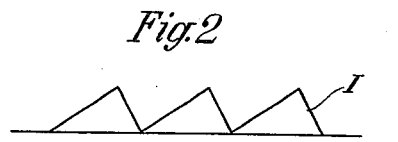

The ultra-short wave fields, by means of suitable directional arrangements, are so caused to radiate, that they are at a suitable angle to each other. Their characteristics are shown schematically in Figure 1 in side elevation (a) and in plan (b). The landing curve, which is designated by L, coincides in view (1b) with the angular bisection H. The two fields have the same wave length, but they are distinguishable from each other in some other way, for example so that in the one angular space only dots are transmitted and in the other only dashes, or signals of different form, but one type may be sent in both angular spaces as hereinafter described.

The transmitting arrangement is particularly simple if the directional systems are keyed with key chokes. The known arrangement described in United States Patent No. 1,931,864, may be employed for this, in which both keying windings of the chokes are connected in series and further one of the chokes has a permanently inserted magnetic winding. With this arrangement upon the closing of the key device, one choke coil is magnetized and the other which has the permanently inserted winding, is not magnetized, as the effects of the two windings are cancelled on this choke. This type of keying has the advantage that two transmitted signals are always exact mirror reflections to each other. If now, one signal is so constructed that it has a slow current rise and a rapid current fall (preferably by control of the switching-in and switching-off operation by means of corresponding band-pass-filters) then the other signal has the reverse characteristic; with it the current rise takes place rapidly and the current fall slowly. The signals thus have the same appearance and per se, are of the same type but are of different form and are as mirror reflections to each other. Keying may be effected in any other suitable manner as for example by the use of a movable coupling coil.

Figure 2:
Fig. 2 shows the current curves of the signals sent in the two sections according to one method of carrying out the invention.
Figure 2:
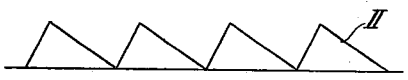

The conditions are shown schematically in Fig. 2. The current curves are shown by I and II, according to the two angular spaces. It is assumed that the signal I has a slow current rise and a rapid current fall and the signal II a rapid current rise and a slow drop. If these signals are conveyed to a suitable receiving arrangement, which is more fully described in the following decription, then it is possible to indicate whether the receiving device is situated on the angular bisection of the fields or not. According to whether the signal rises slowly and falls quickly or vice versa, by interpolating a transformer, the keying characteristic can be utilized to designate the appurtenant field.

Figure 3:
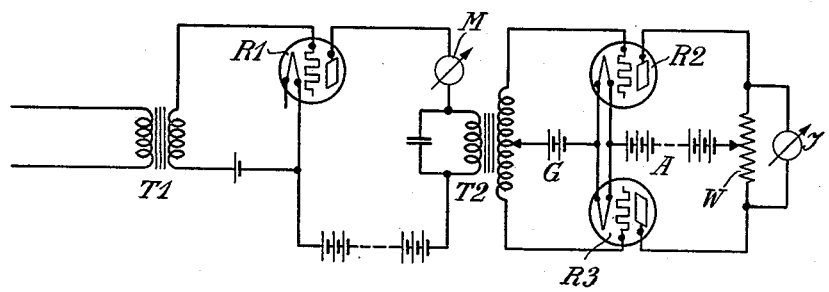
Fig. 3 shows the low frequency amplifying stages of circuit suitable for use with the transmissions indicated in Figs. 1 and 2.

For this purpose preferably the receiving arrangement shown in Fig. 3 may be employed. The received energy is conveyed to a suitable ultra-short wave receiving device, whose last stages are shown in Fig. 3. The received signals are conveyed over a transformer T1 to the grid of a rectifier tube R1. There is arranged in the anode circuit of the tube R1 a transformer T2, whose secondary winding has a centre tap and both of whose ends are connected with the grids of two valves R2 and R3, operating in push-pull and which therefore have no linear characteristics. A bias potential may be given to the grids over the tap by means of a bias potential battery G. In the anode circuit of the valves R2, R3 is a resistance W, which does not affect the quadratic operation of the valves R2 and R3 and the centre point of which is connected to a source of anode potential supplied by the battery A. Parallel to the resistance W is an indicating instrument J. Instead of the instrument J a differential instrument (differential galvanometer) may be employed in the same way. In the anode circuit of the valve R1 an indicating instrument M is included.

The current curves shown in Figure 2 are perceptible in the secondary winding of the transformer T2 as potential peaks in one or other direction. According to whether the signals I or II are less preponderant, the potential impulse is accordingly greater or less, and a greater or less flow of anode curent is obtained in the valves R2 and R3, whose characteristics, as stated, have no linear component. If both fields are of equal magnitude, that is, if the pilot is on the line of angular bisection, then the anode currents of both valves R2, R3 are also of equal magnitude and the pointer of the instrument J is therefore in the middle position. If the signal I or the signal II preponderates, then the deflection of the instrument J deviates more or less from the middle position to one side or the other. Thus, the pilot can read from this instrument the deviation from the line of symmetry of the two directional fields.

The instrument M serves to maintain the landing curve. The instrument M shows the total value of the currents of the rectifier valve R1. The pilot is instructed to manoeuvre his machine in such a way that the deflection of the instrument M remains constant, that is, he is in this way forced to keep to the landing curve.

The receiving device described is essentially similar to that described in United States Patent No. 1,949,256.

Figure 4:
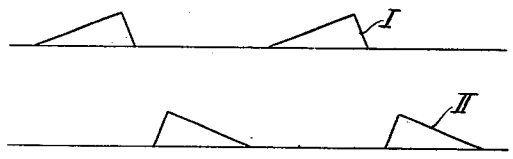
Fig. 4 shows the current curves of signals sent in the two directions according to a modified method of keying.

The keying described by means of Figure 2, in which continuous simultaneous radiation takes place in both angular spaces, has under the circumstances certain disadvantages, which are avoided in accordance with the further invention. The perfect operation of this arrangement is for example doubtful if the first relations of the fields, which are present at the same time, are not kept exact. It is therefore proposed to avoid simultaneous keying and to key the fields alternately. The signals now obtained are shown in Figure 4. It is even possible here to allow a small pause between the end of a signal and the beginning of the next signal.

Figure 5:
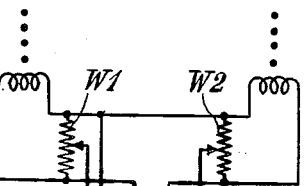
Fig. 5 shows a method of keying suitable for use with the method of operation of Fig. 4.
Figure 6:
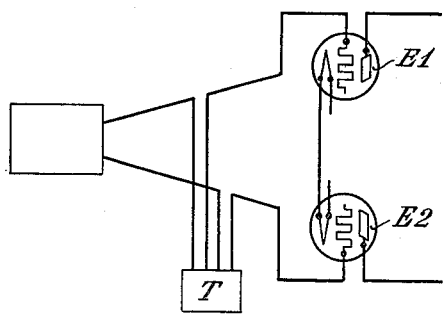
Fig. 6 shows a modified method of keying.

The keying in this case can be conveniently effected in the following maner. Figures 5 and 6 show schematically two arrangements suitable for this. In the arrangement according to Fig. 5, in the antenna leads there are resistances W1 and W2, which are short-circuited by a keying device T, so that the radiation takes place according to Figure 4. The arrangement according to Figure 6 is to be preferred in many cases. Here, in order to avoid high frequency keying, two separate end stages E1 and E2 are provided. These end stages are keyed on the grid side by the keying device R.

It is also possible to couple the instruments M and J together in order to force the pilot to maintain both the lateral direction and also the landing curve. An illuminating device, for example, may be so controlled that the instrument M is only illuminated and can be read if the instrument J indicates that the aeroplane is on the line of angular intersection.

What is claimed is:

1. The method of guiding aeroplanes by radio signals, which consists in radiating two ultra-short wave fields, different from each other but of the same wave length, at an angle to each other and to the ground, so that the pilot can by the angular bisection of these fields ascertain lateral deviations of his aeroplane and can by the curve of constant field intensity ascertain also vertical deviations thereof.

2. The method of guiding aeroplanes in accordance with claim 1, characterized in that one signal element only is transmitted in each of the said fields.

3. The method of guiding aeroplanes by radio signals which comprises radiating two ultra short wave fields with the same wavelength and resembling each other like an object and its image produced by a mirror, said fields being radiated at an angle to each other and to ground, whereby an aeroplane pilot can by the angular bisection of these fields ascertain lateral deviations of the aeroplane and can by the curve of the constant field intensity ascertain also vertical deviations thereof.

4. The method of guiding aeroplanes in accordance with claim 3, characterized in that the said fields are keyed alternately.

FELIX GERTH.
ERNST KRAMAR.